Patented Oct. 30, 1945

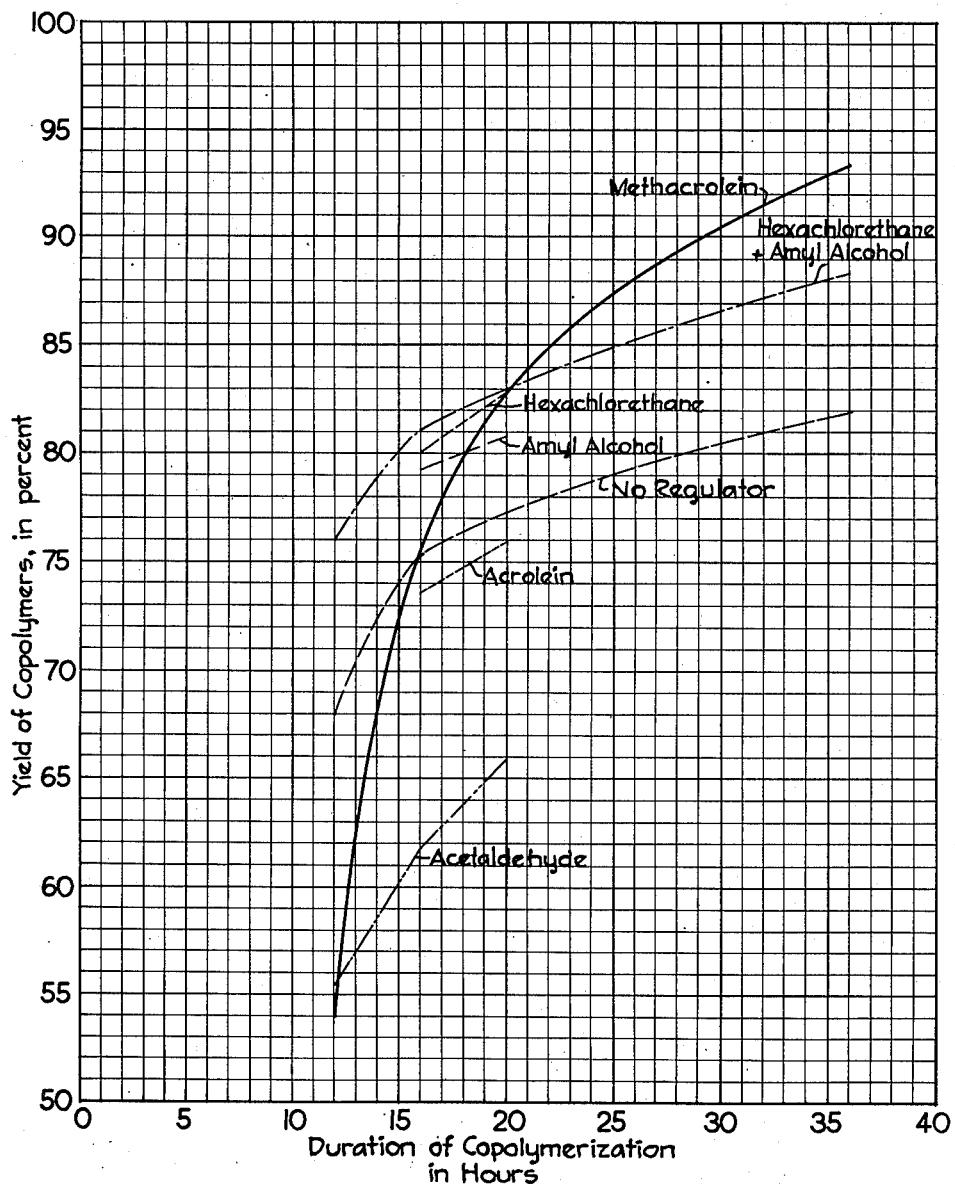

2,388,167

UNITED STATES PATENT OFFICE

2,388,167

METHOD OF REGULATING POLYMERIZATION OF POLYMERIZABLE MIXTURES CONTAINING CONJUGATED DIENE HYDROCARBONS AND PRODUCTS OBTAINABLE THEREBY

Kenneth E. Marple, Oakland, Calif., assignor to Shell Development Company, San Francisco, Calif., a corporation of Delaware Application October 12, 1942, Serial No. 461,756

5 Claims. (Cl. 260—86.5)

The present invention relates to rubber-like synthetic plastic masses and to an improved process for the preparation thereof. More particularly, the invention pertains to a method of obtaining high yields of products of co-polymerization of polymerizable conjugated diene hydrocarbons (i. e. hydrocarbons having conjugated double bonds) with other compounds polymerizable therewith, which compounds contain at least one olefinic linkage per molecule. In one of its most specific embodiments the present invention is directed to a novel method of effecting emulsion co-polymerization of conjugated diene hydrocarbons such as butadiene-1,3, dimethyl butadiene, and the like, with other polymerizable compounds containing at least one olefinic linkage therein, under such controlled conditions that the yield of the resultant co-polymers is considerably higher than that hitherto obtainable, these co-polymers possessing the desirable softness, plasticity and tackiness so that the vulcanizates obtained therefrom are suitable as substitutes for vulcanizates produced from natural rubber.

It is well known that plastic masses having various useful characteristics, some of them resembling rubber in their properties, have been prepared by co-polymerizing mixtures of at least two unsaturated organic compounds, as for example by co-polymerizing a butadiene with at least one other compound polymerizable therewith. These other polymerizable compounds contain at least one olefinic linkage therein which enables coupling of the molecules with the butadiene molecule to form co-polymers. These co-polymers are generally inter-polymerizates of the butadiene with one or more compounds such as chloroprene, isobutylene, styrene, acrylonitrile, methacrylonitrile, methyl vinyl ketone, methyl isopropenyl ketone, methyl methacrylate, cyclopentadiene, the methyl pentadienes, and the like. While the polymerizates may be obtained by effecting the reaction in the presence of a catalyst of the type of sodium or boron tri-fluoride, it is generally preferred to effect the co-polymerization in an aqueous emulsion by using organic peroxides or the persalts as the catalyst.

Generally, when co-polymers are to be prepared by effecting the co-polymerization reaction in an aqueous emulsion or dispersion, the monomers, namely butadiene and one or more of the aforementioned polymerizable compounds containing at least one olefinic linkage, are added to the water containing an emulsifying agent which enables the production of the desired colloidal dispersion of co-polymer, a stabilizer to inhibit premature precipitation of the emulsion, and a catalyst which accelerates the formation of polymerization nuclei. The emulsion thus formed and containing the aforementioned reagents and catalysts is then generally thoroughly agitated at an elevated temperature for a period of time sufficient to cause the desirable co-polymerization. During the initial period of such emulsion polymerization, the reaction monomers react at a relatively high rate which, however, decreases considerably and even stops completely when a certain portion of the butadiene has reacted with the additional monomers, e. g. styrene and the like. Therefore, the yield of the desired co-polymers is relatively low. Although it is possible to increase this yield of the copolymers, for instance, by prolonging the reaction period and/or increasing the reaction temperature, the resulting co-polymers do not possess the desired softness and tackiness, and frequently resemble vulcanized rubber rather than the desired soft unvulcanized product. Also, the vulcanized products formed from such co-polymers usually do not possess the desired flexibility.

It has been previously discovered that the rate of the co-polymerization reaction as well as the direction thereof may be regulated or controlled at least in part by the addition to the emulsion containing the monomers to be polymerized, of certain reaction-regulating or controlling compounds. As such, reference may be made to chlorinated aliphatic hydrocarbons of the type of carbon tetrachloride and hexachlorethane. It has been found, however, that the use of these heretofore known regulators, which apparently also act as agents which inhibit or cut down the branching and cross-linking process during the co-polymerization reaction, does not always permit the production of economic yields of the desired co-polymers. In fact, at least some of the regulators heretofore used in connection with emulsion co-polymerization of butadiene with other polymerizable compounds containing an olefinic linkage, result in the lowering of the yield of the co-polymers as compared to the yields obtainable under identical conditions when no regulator is employed. Furthermore, it has been found that when monomers-containing emulsions, to which the aforementioned known regulators have been added, are subjected to treatment for a period of time sufficient to attain co-polymer yields which are within the range economically desirable, the co-polymers thus formed do not have the desired degree of plasticity and, when compounded and converted into a vulcanizate, produce masses which do not possess the desired degree of flexibility. In other words, although it has been heretofore possible to increase (at least to a certain degree) the yield of co-polymers by the use of known regulators, the co-polymers thus obtained did not possess the desirable degree of softness and tackiness.

It is therefore one of the main objects of the present invention to avoid the above and other defects of the prior art, and to provide a novel process whereby high yields of co-polymers having desired softness and tackiness may be produced. Another object of the invention is to provide a class of regulators which when employed in the emulsion co-polymerization reactions of the class described hereinabove will adequately control or regulate the direction of the polymerization reaction, thus producing co-polymers possessing the desirable characteristics, and at the same time permit the obtaining of heretofore unattainable yields of these co-polymers which may then be readily compounded and treated to produce high-grade synthetic rubbers. A still further object of the present invention is to provide a group of compounds which when added to an aqueous emulsion or dispersion containing butadiene monomers and other olefinic compounds polymerizable therewith, will retard the co-polymerization reaction in the initial stages thereof, but which will promote or catalyze the co-polymerization reaction in the later stages thereof, thereby increasing the yield of the desired co-polymers. Still other objects of the invention will become apparent from the following description.

It has now been discovered that the above and other objects may be attained by employing, as a regulator, an alpha-beta unsaturated aliphatic aldehyde containing a tertiary carbon atom in alpha position. More specifically, it was found that small percentages of an acrolein derivative containing a monovalent alkyl radical attached to the alpha carbon atom, when added to aqueous emulsions containing a conjugated diene hydrocarbon, e. g. butadiene, and at least one other unsaturated monomer capable of polymerizing therewith, permit the obtainment of high yields of co-polymers having characteristics which permit the compounding and treatment thereof to produce vulcanizates suitable as substitutes for vulcanized rubber produced from natural rubber. It has been still further discovered that methacrolein is particularly suitable for the above purpose and that, when employed as an auxiliary agent or regulator in the above-outlined emulsion co-polymerization reactions of a butadiene with one or more other unsaturated polymerizable compounds, it permits the production of very high yields of the desirable co-polymers while, at the same time, initially retarding the co-polymerization reaction and thus controlling the direction of the polymerization reaction and the character of the resultant co-polymers. These co-polymers, as stated, are produced in yields which are considerably greater than those obtainable with the heretofore known regulators without sacrificing the desired characteristics, e. g. plasticity, so that they may be readily compounded and treated in the known manner to produce high grade vulcanizates.

Methacrolein is the preferred auxiliary agent or regulator to be used in accordance with the present invention in the emulsion co-polymerization of a conjugated diene hydrocarbon with one or more other polymerizable compounds or monomers having at least one olefin linkage therein. However, included within the scope of the invention are the other alpha-beta unsaturated aliphatic aldehydes containing a tertiary carbon atom in the alpha position. The following are representative examples of the unsaturated aldehydes suitable as regulators in the above-mentioned emulsion co-polymerization reactions: methacrolein, α-ethyl acrolein, tiglic aldehyde, α-methyl β-ethyl acrolein, and the like. It is readily seen that this class of compounds have a tertiary carbon atom in alpha position, and that the general chemical formula is

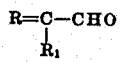

wherein R and $R_1$ are acyclic hydrocarbon radicals. Of the above class of unsaturated aldehydes it is preferable to employ those in which the radical attached by the double bond to the aforementioned tertiary carbon atom is a methylene group. Insofar as known at the present time, methacrolein, which is the first member of this preferred group, is considered to possess particularly satisfactory properties as an auxiliary agent or regulator for the emulsion co-polymerization reactions of the class defined hereinabove.

The proportion of the above-defined unsaturated aliphatic aldehyde, e. g. methacrolein, to be added to the emulsion may vary considerably depending to a large extent on the particular substances, i. e. the monomers, to be co-polymerized. It is to be noted that these aldehydes having a tertiary carbon atom in the alpha position are unsaturated and, therefore, will react, at least in part, with the other monomers subjected to co-polymerization. Therefore, it is possible to add relatively high percentages of these unsaturated aldehydes to the monomer-containing emulsions. However, in general, relatively small percentages of the defined auxiliary agent or regulator are sufficient to obtain the desired results. For instance, although the methacrolein and the like may be added in amounts up to about 5% as calculated on the weight of the monomers subjected to co-polymerization, it is ordinarily sufficient to employ the methacrolein in amounts ranging from about 0.1% to about 1% of the weight of the monomers in the emulsion. However, in special cases a smaller or still lesser proportion may be used and even found to be advantageous.

The above-defined unsaturated aldehyde, e. g. methacrolein, is incorporated into the emulsion containing the butadiene and other monomers to be co-polymerized, or into the aqueous solution to which the monomers are to be added. In view of the fact that the emulsion co-polymerization reactions are ordinarily effected in the presence of oxidizing agents which act as the reaction catalysts, and since the methacrolein and the other unsaturated aldehydes of the defined class react, probably via polymerization, when in the presence of these agents, it is recommended to add the methacrolein to the emulsion immediately prior to the time when the co-polymerization reaction is to be effected.

The invention is illustrated by the following examples which are presented herein for the purpose of showing the advantages derived from operating according to the process of this invention and the results obtained thereby. It is to be understood, however, that these examples are merely illustrative of the invention and are not to be considered as limiting the invention in any sense.

Example I

A number of co-polymers were prepared under identical conditions except for the fact that, in order to determine the effect of various regulators, these emulsion co-polymerizations were conducted for different periods of time, both in the absence of any regulator and in the presence of regulators known heretofore, as well as in the presence of methacrolein. In all cases the emulsions were prepared by emulsifying 55 parts by weight of butadiene-1,3, 25 parts by weight of styrene and 20 parts by weight of a mixture of 2-methyl-pentadiene-1,3 and 4-methyl pentadiene-1,3 in about 175 parts of a 5% Ivory soap solution containing about 2.86% of $NaBO_3 \cdot 4H_2O$ and about 1% of $Na_3PO_4 \cdot 12H_2O$ (the former being the catalyst, while the phosphate was employed as a buffer). In the cases where the regulators were used, these were then added to the prepared emulsions. The emulsions were then stirred for various periods of time while maintaining the dispersions at a temperature of about 50° C. At the end of the specified time, coagulation of the co-polymers formed was effected by the addition of acetic acid to the dispersion. The coagulated mass was in each case then separated from the aqueous phase, washed, and dried, thus permitting the calculation of the co-polymer yield.

The yields of, and plasticity loads for, the different co-polymers thus formed are presented in the following table, it being noted that in most cases duplicate or check runs were conducted so that two sets of figures are found for most of the yields and plasticity load data presented in this table.

| Regulators, in wt. percent on $H_2O$ | Duration of co-polymerization, in hrs. | Yield, in per cent | |
|---|---|---|---|
| 3% hexachlorethane and 0.2% amyl alcohol | 12 | 77 | 75 |
| Do | 16 | 81.7 | 80.8 |
| Do | 20 | 82.6 | 83.4 |
| Do | 36 | 88.1 | 88.8 |
| 3% hexachlorethane | 16 | 77.9 | 80.2 |
| Do | 20 | 82.8 | 82.8 |
| 0.4% amyl alcohol | 16 | 79.1 | 79.5 |
| Do | 20 | 80.6 | 81.1 |
| 0.2% acetaldehyde | 12 | 54 | 57 |
| Do | 16 | 62.4 | 61.2 |
| Do | 20 | 65.1 | 66.8 |
| 0.255% acrolein | 16 | 73.6 | |
| Do | 20 | 75.9 | |
| 0.32% methacrolein | 12 | 54 | 54 |
| Do | 16 | 76.3 | 74.7 |
| Do | 20 | 82.4 | 83.1 |
| Do | 36 | 93.6 | 93.2 |
| None | 12 | 69 | 67 |
| Do | 16 | 76.5 | 74.1 |
| Do | 20 | 77.3 | |
| Do | 36 | 82.0 | 82.1 |

An analysis of the results presented above indicates the advantages which are obtainable when the emulsion co-polymerization reaction is effected in accordance with the present invention. For a better illustration and understanding of the tabulated results, these have been graphically presented in the accompanying drawing. A reference thereto clearly shows the superior qualities of methacrolein as a regulator for the emulsion co-polymerization of a conjugated diene hydrocarbon with one or more other monomers polymerizable therewith. For instance, these results prove that, although the use of some of the heretofore known regulators such as hexachlorethane, amyl alcohol, and mixtures thereof, results in the production of somewhat higher yields than those obtainable by co-polymerization in the absence of a regulator, these yields are still considerably below theoretical. Also, as this is shown by a flattening of the curves in the drawing, a certain maximum is reached so that further reaction does not result in any material increase in the yield of the co-polymers. The above data also show that at least certain of the saturated and unsaturated aldehydes (which do not have a tertiary carbon atom in the alpha position) retard the co-polymerization reaction and thus cause the obtainment of co-polymer yields which are lower than those produced when the reaction is effected under like conditions but in the absence of any regulator. On the other hand, the use of even small percentages of methacrolein, which retards the co-polymerization reaction in its initial stages, permits the production of co-polymer yields which are considerably greater than those obtainable with any of the known regulators. Also, these co-polymers were found to be sufficiently plastic and tacky to permit the production of vulcanizates having properties which render them suitable as rubber substitutes.

Example II

Two co-polymers were prepared under identical conditions except for the regulator employed during the co-polymerization reaction. In both cases the dispersion was prepared by emulsifying 75 parts by weight of butadiene-1,3 and 25 parts by weight of styrene with 125 parts by weight of a 5% Ivory soap solution containing 1.3% of $K_2S_2O_8$ (used as the catalyst) and 1% of $Na_3PO_4 \cdot 12H_2O$ (the buffer). The regulating agent in one of these runs consisted of 0.2% of acetaldehyde (as measured on the aqueous phase), while 0.32% of methacrolein was added to the second emulsion. Both batches were then agitated for five hours at a temperature of about 50° C., and the resultant mixtures were then individually treated in accordance with the process described in the previous example to recover therefrom the coagulated products of co-polymerization. It was found that whereas the yield of co-polymers obtained from the co-polymerization in the presence of acetaldehyde was only 21.6% of the treated monomers, in the run in which methacrolein was used the yield was equal to 27.2%.

Example III

Three co-polymers were prepared by the emulsion co-polymerization of a mixture of 75 parts by weight of butadiene and 25 parts by weight of styrene in 125 parts by weight of a 5% Ivory soap solution containing 2.6% $K_2S_2O_8$ and 1% of $Na_2PO_4 \cdot 12H_2O$, the emulsion co-polymerizations being effected in the presence of different regulators, with stirring for a period of six hours and while maintaining the mixtures at a temperature of about 50° C. The mixtures were then treated according to the process of Example I to recover therefrom the co-polymers. The yields obtained are tabulated hereinbelow.

| Regulator employed, in wt. percent on $H_2O$ | Yield, in per cent |
|---|---|
| 3% hexachlorethane and 0.2% amyl alcohol | 28.3 |
| 0.2% acetaldehyde | 29.2 |
| 0.32% methacrolein | 51.2 |

The above results clearly show the unexpected characteristics and superior qualities of methacrolein as a regulator for the emulsion co-polymerization of the defined classes of unsaturated polymerizable monomers.

The present invention is broader in scope than the above examples, which have been limited, particularly with respect to the monomers employed and the proportion of the methacrolein used, in order to illustrate more clearly the beneficial results and advantages of the present invention, particularly as it effects a change in one variable at a time. The materials used at all points of the co-polymerization reaction, their relative proportions, and the physical conditions under which the process may be carried out are all subject to wide variation. For instance, although the examples disclosed the co-polymerization of butadiene-1,3 with other polymerizable compounds, any other conjugated diene hydrocarbon may be used in lieu thereof or in conjunction therewith to produce the desirable rubber-like co-polymer. As examples of such dienes, reference may be made to isoprene, 2,3-dimethyl-butadiene-1,3, and the like, and their homologues. In general, it may be said that, in order to obtain co-polymers having very useful combinations of properties, the conjugated dienes employed in emulsion co-polymerization reactions should constitute between about 60% and about 80% of the monomers treated, these percentages relating to the total conjugated diene hydrocarbon content of the monomers introduced into the aqueous medium. It is to be understood however that in some cases both larger and smaller proportions than are included within the above limits may also be used.

It has been brought out above that the present process is directed to emulsion co-polymerization of the aforesaid conjugated diene hydrocarbons with one or more other polymerizable compounds having one or more olefin linkages therein. It was also stated that, although in the examples styrene has been disclosed as such other polymerizable compound, it is possible to employ still other compounds, such as chloroprene, isobutylene, acrylonitrile, methacrylonitrile, methyl vinyl ketone, methyl isopropenyl ketone, methyl methacrylate, and the like, and their homologues and analogues. The use of any one or more of these compounds as the second or additional monomer is well known in the art. Since this compound constitutes the balance of the monomers employed in the preparation of the co-polymers, it is generally employed in an amount of between 20% and 40% of the treated monomers.

Instead of using sodium perborate as the catalyst, the emulsion co-polymerization may also be accelerated by the other known polymerization catalysts, e. g. hydrogen peroxide, benzoyl peroxide, ammonium persulfate, as well as by increasing the temperature, pressure, or concentration of emulsifying agent, or by adjusting the hydrogen ion concentration, or by the choice of emulsifying agent. Also, the concentration of the dispersed phase in the emulsion may be varied within a wide range, although this may result in the production of co-polymers having somewhat different results. Generally, the aqueous phase must be employed in an excess, and will usually represent between somewhat over 50% and about 80% of the weight of the total dispersion. The emulsion co-polymerizations are generally effected at temperatures of from about 20° C. to about 100° C. However, other reaction temperatures may also be used.

It is thus seen that the invention is applicable to the emulsion co-polymerization of a wide variety of polymerizable monomers, that various means of effecting such co-polymerization may be used, and that the essential features of the present invention are predicated on the discovery that the use of minor amounts of the specified unsaturated aldehydes, and particularly of methacrolein, permits the obtainment of very high yields of co-polymers having desirable characteristics.

I claim as my invention:

1. In a process for effecting the copolymerization, in the form of an aqueous emulsion, of 60% to 80% of butadiene-1,3 hydrocarbons with 20% to 40% of monomeric olefinic compounds polymerizable therewith in aqueous emulsion, the method of increasing the yield and improving the characteristics of the copolymer product which comprises conducting the copolymerization to substantial completion in the presence of from 0.1% to 5% by weight of the copolymerized monomers of an alpha,beta-unsaturated aldehyde containing from 4 to 5 carbon atoms and a tertiary carbon atom in alpha position.

2. In a process for effecting the copolymerization, in the form of an aqueous emulsion, of 60% to 80% of butadiene-1,3 hydrocarbons with 20% to 40% of monomeric olefinic compounds polymerizable therewith in aqueous emulsion, the method of increasing the yield and improving the characteristics of the copolymer product which comprises conducting the copolymerization to substantial completion in the presence of from 0.1% to 5% by weight of the copolymerized monomers of methacrolein.

3. In a process for effecting the copolymerization, in the form of an aqueous emulsion, of 60% to 80% of butadiene-1,3 with 20% to 40% of a monomeric olefinic compound copolymerizable therewith in aqueous emulsion, the method of increasing the yield and improving the characteristics of the copolymer product which comprises conducting the copolymerization to substantial completion in the presence of from 0.1% to 5% by weight of the copolymerized monomers of methacrolein.

4. In a process for effecting the copolymerization, in the form of an aqueous emulsion, of 60% to 80% of butadiene-1,3 with 20% to 40% of styrene, the method of increasing the yield and improving the characteristics of the copolymer product which comprises conducting the copolymerization to substantial completion in the presence of from 0.1% to 5% methacrolein based on the weight of the butadiene and styrene.

5. In a process for effecting the copolymerization, in the form of an aqueous emulsion, of a mixture consisting of about 55% of butadiene-1,3, about 20% of a mixture of 2-methyl pentadiene-1,3 and 4-methyl pentadiene-1,3, and about 25% of styrene, the method of increasing the yield and improving the characteristics of the copolymer product which comprises conducting the copolymerization to substantial completion in the presence of from 0.1% to 5% methacrolein based on the weight of the butadiene and styrene.

KENNETH E. MARPLE.